United States Patent
Gumpoltsberger

(10) Patent No.: US 7,131,924 B2
(45) Date of Patent: Nov. 7, 2006

(54) MULTIPLE GEAR TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 10/499,318

(22) PCT Filed: Dec. 17, 2002

(86) PCT No.: PCT/EP02/14378

§ 371 (c)(1),
(2), (4) Date: Jun. 17, 2004

(87) PCT Pub. No.: WO03/054422

PCT Pub. Date: Jul. 3, 2003

(65) Prior Publication Data

US 2005/0107206 A1    May 19, 2005

(30) Foreign Application Priority Data

Dec. 20, 2001 (DE) ................. 101 62 880

(51) Int. Cl.
*F16H 3/62* (2006.01)
(52) U.S. Cl. ............. 475/276; 475/275; 475/278; 475/279; 475/280
(58) Field of Classification Search .......... 475/275, 475/276, 277, 278, 279, 280
See application file for complete search history.

(56) References Cited

U.S. PATENT DOCUMENTS

| | | |
|---|---|---|
| 4,428,254 A | 1/1984 | Hohn |
| 5,106,352 A | 4/1992 | Lepelletier |
| 6,053,839 A | 4/2000 | Baldwin et al. |
| 6,083,135 A | 7/2000 | Baldwin et al. |
| 6,302,820 B1 | 10/2001 | Riedl |
| 6,572,507 B1 | 6/2003 | Korkmaz et al. |
| 6,634,980 B1 | 10/2003 | Ziemer |
| 6,659,903 B1 * | 12/2003 | Bucknor et al. ............ 475/276 |
| 6,659,904 B1 * | 12/2003 | Usoro et al. ................ 475/276 |
| 6,672,987 B1 * | 1/2004 | Raghavan et al. .......... 475/269 |

(Continued)

FOREIGN PATENT DOCUMENTS

DE  1 505 723  7/1970

(Continued)

OTHER PUBLICATIONS

Tenberge, Prof. Dr. P., "E-Automat Automatikgetriebe mit Esprit", *VDI-BERICHTE*, Nr. 1610, Jun. 20, 2001, pp. 455-479.

*Primary Examiner*—Rodney H. Bonck
*Assistant Examiner*—David D. Le
(74) *Attorney, Agent, or Firm*—Davis & Bujold, P.L.L.C.

(57) ABSTRACT

Multiple gear transmission comprising input and output shafts (1, 2), three planetary sets (P1, P2, P3), six rotatable shafts (1, 2, 3, 4, 5, 6) and six shifting elements (03, 04, 05, 14, 16, 56). Selective engagement of the shifting elements produces seven forward and two reverse gears. The input shaft is connected with the sun gear of the first planetary set (P1), the output shaft with the web of the second planetary set (P2), the third shaft (3) with the sun gears of second and third planetary sets (P2, P3), one shaft (4) connects the web of the first planetary set (P1) with the ring gear of the third planetary set (P3), one shaft (5) is connected with the ring gear of the first planetary set (P1), one shaft (6) connects the web of the third planetary set (P3) with the ring gear of the second planetary set (P2).

18 Claims, 4 Drawing Sheets

U.S. PATENT DOCUMENTS 6,860,831 B1 * 3/2005 Ziemer .................. 475/296

FOREIGN PATENT DOCUMENTS

| | | |
|---|---|---|
| DE | 199 12 480 A1 | 9/2000 |
| DE | 199 10 299 C1 | 4/2001 |
| DE | 199 49 507 A1 | 4/2001 |
| EP | 0 434 525 A1 | 6/1991 |
| JP | 02154840 A | 6/1990 |
| JP | 04029650 A | 1/1992 |

* cited by examiner

| | 14 45 | 16 | 56 | 03 | 04 | 05 | $i$ | $\mu$ |
|---|---|---|---|---|---|---|---|---|
| 1. Gear | | | | ● | | ● | 5.192 | |
| | | | | | | | | 1.769 |
| 2. Gear | | | ● | ● | | | 2.934 | |
| | | | | | | | | 1.554 |
| 3. Gear | ● | | | ● | | | 1.888 | |
| | | | | | | | | 1.464 |
| 4. Gear | | ● | | ● | | | 1.290 | |
| | | | | | | | | 1.290 |
| 5. Gear | ● | ● | | | | | 1.000 | |
| | | | | | | | | 1.308 |
| 6. Gear | | ● | | | | ● | 0.764 | |
| | | | | | | | | 1.135 |
| 7. Gear | | ● | | | ● | | 0.674 | |
| | | | | | | | | 1.093 |
| R1. Gear | | | ● | | | ● | -5.673 | |
| | | | | | | | | 0.227 |
| R2 Gear | | | ● | | ● | | -1.179 | |

Fig. 3

MULTIPLE GEAR TRANSMISSION

This application is a national stage completion of PCT/EP02/14378 filed Dec. 17, 2002 which claims priority from German Application Serial No. 101 62 880.3 filed Dec. 20, 2001.

FIELD OF THE INVENTION

The invention relates to a multiple gear transmission, especially an automatic transmission for a motor vehicle.

BACKGROUND OF THE INVENTION

Automatic transmissions, especially for motor vehicles, comprise planetary sets shifted by means of frictional or shifting elements, according to the prior art, such as clutches and brakes and usually connected with a starting element like a hydrodynamic torque converter or a fluid clutch subject to slip action and optionally provided with a bridge clutch.

One such transmission results from EP 0 434 525 A1. It essentially comprises one input shaft and one output shaft disposed in parallel, one double planetary gear set situated concentrically to the output shaft and five shifting elements in the form of three clutches and two brakes, the selective locking of which by pairs determines the different gear ratios between the input shaft and the output shaft.

Also known from the Applicant's DE 199 49 507 A1 is a multiple gear transmission where on the input shaft two non-shiftable front-mounted gear sets are provided which produce the output side two rotational speeds which together with the rotational speed of the input shaft can optionally be shifted by selective closing of the shifting elements used to a shiftable double planetary gear set acting upon the output shaft in a manner such that for changing from one gear to the respective higher or lower gear that follows, only one shifting element of the two just actuated shifting elements has to be engaged or disengaged.

There has also been disclosed within the scope of EP 0 434 525 A1 one multiple gear transmission containing one input shaft and one output shaft located in one housing, one planetary set concentric with the output shaft and consisting of four elements designated from one first to one fourth in order of rotational speed, that is, one so-called double planetary set and five shifting elements, namely, three clutches and two brakes, the selective engagement of which by pairs determines different reduction ratios between input shaft and the output shaft, the transmission having two power paths so that by the selective engagement by pairs of the five shifting elements six forward gears are achieved.

DE 199 10 299 C1 has disclosed a planetary gear variable transmission having three transmission elements where one input shaft can be brought to driving connection with one output shaft by at least one of three planetary gear transmission elements. In the known planetary gear variable transmission, by using each time three frictional-engagement clutches and brakes, it is possible to shift five forward gears including one direct gear having a predetermined ratio.

In the known planetary gear variable transmission, it is possible by interrupting a specific driving connection between two of the three transmission elements, to provide an added sixth forward gear. In another embodiment, this is accomplished by additional auxiliary planets and by an added outer auxiliary central gear that meshes with the latter and by an additional brake can be decelerated in the sixth forward gear. In the other embodiments, the auxiliary central gear makes still one seventh forward gear and one additional reverse gear possible.

The problem on which this invention is based is to propose a multiple gear transmission of the kind mentioned above where the construction cost is optimized and, in addition, the effectiveness in the main driving gears is improved with regard to the towing and toothing losses.

SUMMARY OF THE INVENTION

An inventive multiple gear transmission in planetary design is accordingly proposed which has one input shaft and one output shaft located in one housing. There are further provided three single-web planetary sets, six rotatable shafts and six shifting elements comprising clutches and brakes whose selective engagement by pairs produces different reduction ratios between input shaft and output shaft so that seven forward gears and two reverse gears can preferably be implemented.

According to this invention, in the multiple gear transmission is provided that the input results by one shaft directly connected with the sun gear of the first planetary set and that the output results via one shaft connected with the web of the second planetary set. It is further provided in the inventive multiple gear transmission that one other shaft be permanently connected with the sun gear of the second planetary set and the sun gear of the third planetary set, that one shaft permanently connects the web of the first planetary set with the ring gear of the third planetary set, that one shaft be permanently connected with the ring gear of the first planetary set and that one other shaft connects the web of the third planetary set with the ring gear of the second planetary set, the planetary sets being coupled with shafts and shifting elements.

The inventive development of the multiple gear transmission results in adequate ratios and considerable increase of the total spread of the multiple gear transmission whereby the driving comfort is improved and consumption significantly reduced.

The inventive multiple gear transmission is suitable for every motor vehicle, especially for passenger vehicles and for industrial motor vehicles such as trucks, autobuses, construction vehicles, rail vehicles, track-laying vehicles and the like.

Due to the small number of shifting elements, preferably three clutches and three brakes, the construction cost is considerably reduced with the inventive multiple gear transmission. It is advantageously possible with the inventive multiple gear transmission to start with a hydrodynamic converter, an external starting clutch, or also any other suitable external starting elements. It is also conceivable to make a starting operation possible with one starting element integrated in the transmission. One shifting element actuated to the first gear and to the reverse gear is preferably adequate.

With the inventive multiple gear transmission, a good efficiency further results in the main drive gears in relation to towing and toothing losses.

Besides, small torques exist in the shifting elements and in the planetary sets of the multiple gear transmission whereby the wear is advantageously reduced in the multiple gear transmission. The low torques also make a correspondingly small dimensioning possible whereby the needed installation space and the costs are reduced. In addition, there are also low rotational speeds in the shafts, the shifting elements and the planetary sets.

Besides, the inventive transmission is drafted so as to make possible an adaptability to different drive line designs both in power flow direction and with regard to space.

BRIEF DESCRIPTION OF THE DRAWINGS

The invention will now be described, by way of example, with reference to the accompanying drawings in which:

FIG. 3 is a wiring diagram for the inventive multiple gear transmission according to FIGS. 1 and 2;

DETAILED DESCRIPTION OF THE INVENTION

Figure 1:
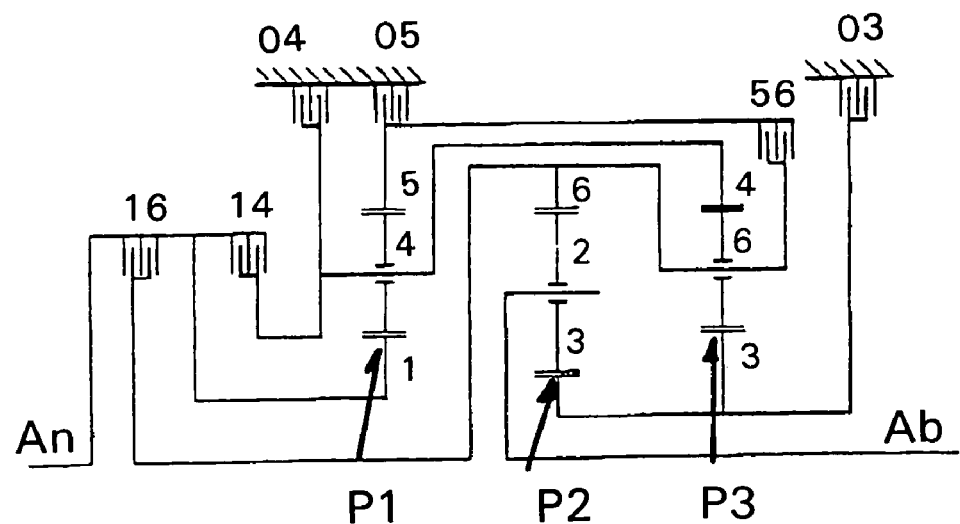
FIG. 1 is a diagrammatic view of a first embodiment of an inventive multiple gear transmission.

In FIG. 1 is shown the inventive multiple gear transmission with one input shaft 1 (An) and one output shaft 2 (Ab) located in one housing. Three planetary sets P1, P2, P3 are provided which are preferably minus planetary sets.

Figure 2:
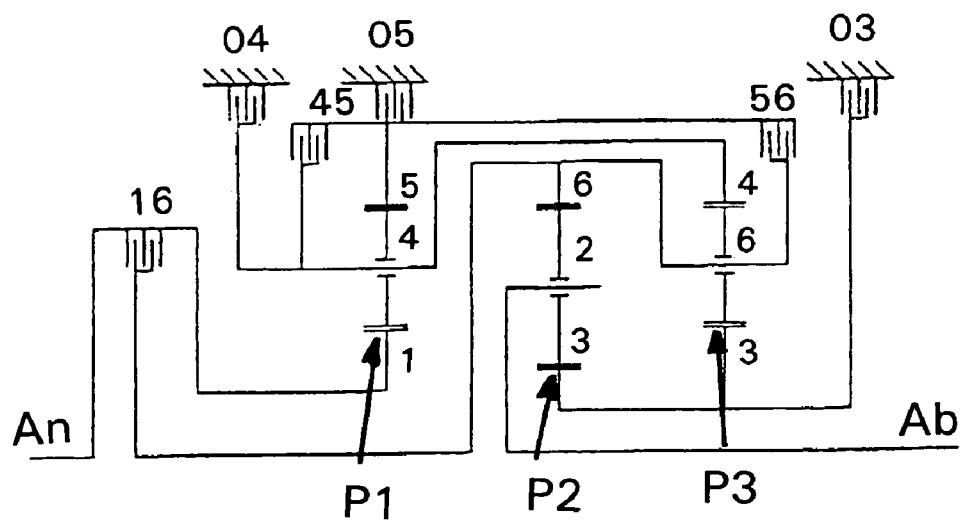
FIG. 2 is a diagrammatic view of a second embodiment of an inventive multiple gear transmission.

As can be seen from FIGS. 1 to 3, only six shifting elements are provided. In the first embodiment according to FIG. 1, three brakes 03, 04 and 05 and three clutches 14, 16 and 56 are provided. In the second embodiment according to FIG. 2, the brakes 03, 04 and 05, the same as clutches 45, 16 and 56, are provided.

A selective shifting of seven forward gears and two reverse gears can be implemented by the shifting elements provided in the embodiments. The inventive multiple gear transmission has a total of six rotatable shafts, namely, shafts 1, 2, 3, 4, 5 and 6.

In the two embodiments shown of the multiple gear transmission, it is inventively provided that the input results by the shaft 1 which is directly connected with the sun gear of the first planetary set P1 and that the output results via the shaft 2 connected with the web of the second planetary set P2. In addition, the shaft 3 is permanently connected with the sun gear of the second planetary set P2 and the sun gear of the third planetary set P3 and the shaft 4 permanently connects the web of the first planetary set P1 with the ring gear of the third planetary set P3. The shaft 5 is besides permanently connected with the ring gear of the first planetary set P1. The shaft 6 permanently connects the web of the third planetary set P3 with the ring gear of the second planetary set P2.

In both embodiments according to FIGS. 1 and 2, respectively, to the housing can be attached the shaft 3 by the brake 03, the shaft 4 by the brake 04 and the shaft 5 by the brake 05. The clutch 16 detachably interconnects the shaft 1 and the shaft 6. The shaft 5 and the shaft 6 are detachably interconnected via the clutch 56.

In the first embodiment of the inventive multiple gear transmission according to FIG. 1, the shaft 1 and the shaft 4 are additionally detachably interconnected by the clutch 14. Differing therefrom, in the second embodiment according to FIG. 2, the shaft 4 and the shaft 5 are detachably interconnected via the clutch 45.

In FIG. 3 is shown a wiring diagram of the inventive multiple gear transmission which applies to both embodiments. A difference is that for the first embodiment in FIG. 1, the clutch 14 and for the second embodiment according to FIG. 2 the clutch 45 are respectively provided next to the other clutches 16 and 56.

A respective ratios i of the individual gear steps and a ratio ranges $\phi$ to be determined therefrom can be deduced by way of example from the wire diagram of the inventive multiple gear transmission shown in FIG. 3. From the wiring diagram can also be deduced that double shifts are prevented in sequential shifting mode, since two adjacent gear steps respectively, use in common one shifting element. It can further be deduced from the wiring diagram of FIG. 3 that in every desired shift between the first and the fourth gear, the same as between the fourth and the seventh gear, only one shifting element has to be additionally actuated.

In shifting operations between the first and the fourth gears, th brake 03 is activated each time, there being additionally activated in the first gear the brake 05, in the second gear the clutch 56, in the third gear the clutch 14 in the first embodiment or the clutch 45 in the second embodiment and the clutch 16 in the fourth gear.

During shifting operations between the fourth and the seventh gear, the clutch 16 is activated each time and additionally activated are in the fifth gear the clutch 14 in the first embodiment or the clutch 45 in the second embodiment, in the sixth gear the brake 05 and in the seventh gear the brake 04. In the first reverse gear, the brake 05 and the clutch 56 are activated as shifting elements, the brake 04 and the clutch 56 being activated in the second reverse gear.

Figure 4:
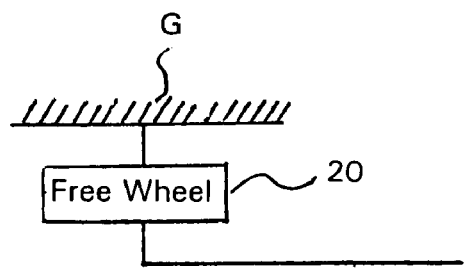
FIG. 4 is a diagrammatic drawing showing an additional free wheel.

It is possible, according to the invention, to provide additional free wheels 20 on each adequate place of the multiple gear transmission, for example, between one shaft and the housing or in order to separate or also to connect one shaft, only one of which is shown in FIG. 4.

Figure 5:
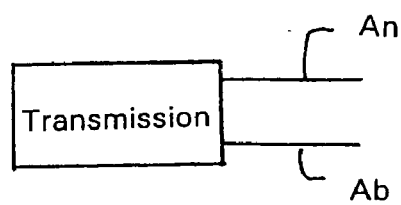
FIG. 5 is a diagrammatic drawing showing the input and the output provided on the same side of the housing.
Figure 6:
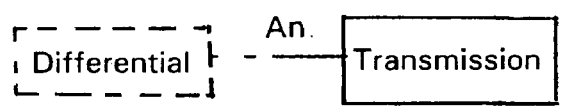
FIG. 6 is a diagrammatic drawing showing incorporation of an axle or a distributor differential.

In addition the inventive design makes situating both the input An and the output Ab on the same side of the transmission possible or of the housing, preferably for transverse, forward, rear-longitudinal or four-wheel arrangements, as shown in FIG. 5. One axle differential or one distributor differential 22 can also be placed on the input side, as shown in FIG. 6.

Figure 7:
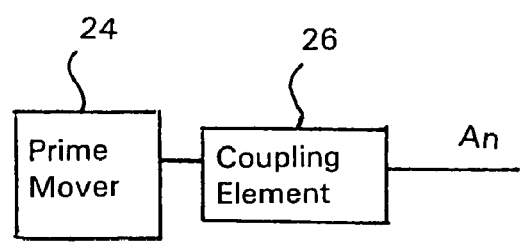
FIG. 7 is a diagrammatic drawing showing incorporation of a coupling element.
Figure 8:
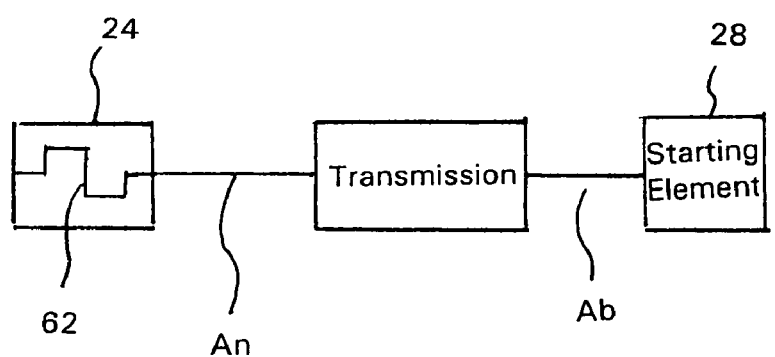
FIG. 8 is a diagrammatic drawing showing incorporation of an external starting element and an engine.

Within the scope of an advantageous development, the input shaft can be separated, as needed, from a prime mover or an engine 24 by a coupling element 26, it being possible to use one hydrodynamic converter, one hydraulic clutch, one dry starting clutch, one wet starting clutch, one magnetic clutch, or one centrifugal clutch as a coupling element 26, as shown in FIG. 7. It is also possible to situate one such starting element 28 in power flow direction behind the transmission, the input shaft being, in this case, permanently connected with the crankshaft of the engine or a prime mover 24, as shown in FIG. 8. According to the invention, it is also possible to start by means of one shifting element of the transmission. As shifting element can preferably be used the brake 03, the brake 04, or the brake 05.

Figure 9:
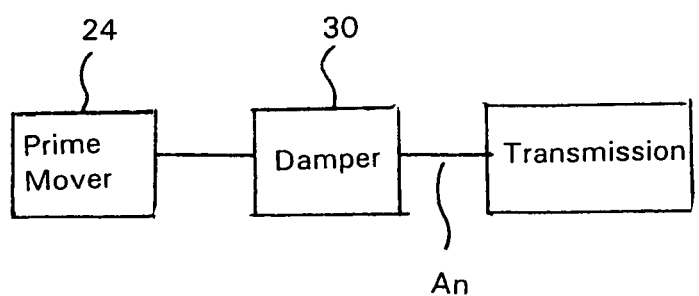
FIG. 9 is a diagrammatic drawing showing incorporation of a torsional vibration damper.

The inventive multiple gear transmission also makes one torsional vibration damper 30 possible to place between the engine or the prime mover 24 and the transmission, as shown in FIG. 9.

Figure 10:
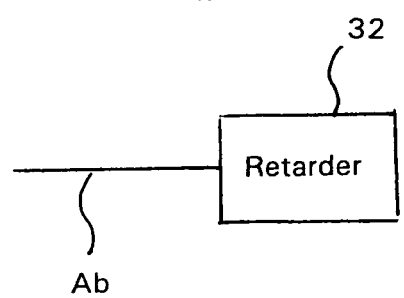
FIG. 10 is a diagrammatic drawing showing incorporation of a wear-free brake situated upon at least one of the six rotational shafts.
Figure 11:
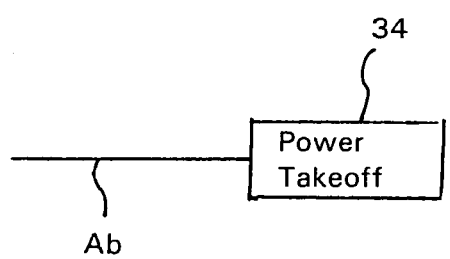
FIG. 11 is a diagrammatic drawing showing incorporation of a power takeoff.

Within the scope of another embodiment of the invention, it is possible to situate upon each shaft, preferably upon the input shaft 1 or the output shaft 2, one wear-free brake 32 such as a hydraulic, electric retarder, or the like, which is of special importance for use in industrial vehicles, as shown in FIG. 10. For driving additional aggregates, it is further possible upon each shaft to provide one power take off 34, preferably upon the input shaft 1 or the output shaft 2, as shown in FIG. 11.

The shifting elements used can be designed as powershift clutches or brakes. There can be specially used force-locking clutches or brakes such as multi-disc clutches, band brakes and/or cone clutches. As shifting elements can also be used form-locking brakes and/or form-locking clutches such as synchronizer or dog clutches.

Figure 12:
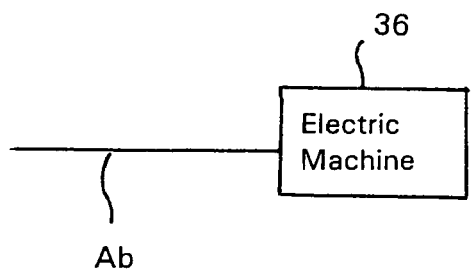
FIG. 12 is a diagrammatic drawing showing incorporation of an electric machine which is mounted upon at least one of the six rotatable shafts.

One other advantage of the multiple gear transmission introduced here consists in that an electric machine 36 can be mounted on each shaft as generator and/or as additional prime mover, as shown in FIG. 12.

The shifting elements used can be designed as powershift clutches or brakes. There can be specially used force-locking clutches or brakes such as multi-disc clutches, band brakes and/or cone clutches. As shifting elements can also be used form-locking brakes and/or clutches such as synchronizer or dog clutches.

One other advantage of the multiple gear transmission introduced here consists in that an electric machine can be mounted on each shaft as generator and/or as additional prime mover.

REFERENCE NUMERALS 1 shaft
2 shaft
3 shaft
4 shaft
5 shaft
6 shaft
03 brake
04 brake
05 brake
14 clutch
16 clutch
45 clutch
56 clutch
P1 planetary set
P2 planetary set
P3 planetary set
An input
Ab output
i ratio
φ ratio range

The invention claimed is:

1. A multiple gear transmission of a planetary design for an automatic transmission of a motor vehicle, the multiple gear transmission comprising:

an input shaft (1) and an output shaft (2) accommodated within a housing;

single-web first, second and third planetary sets (P1, P2, P3);

third, fourth, fifth and sixth rotatable shafts (3, 4, 5, 6); and six shifting elements (03, 04, 05, 14, 16, 45, 56), including brakes and clutches, such that selective engagement of pairs of the six shifting elements (03, 04, 05, 14, 16, 45, 56) produces different reduction ratios between said input shaft (1) and said output shaft (2) so that seven forward gears and two reverse gears can be implemented;

wherein an input results from direct connection of the input shaft (1) with a sun gear of the first planetary set (P1), an output results via the output shaft (2) connected with a web of the second planetary set (P2), the third shaft (3) is permanently connected with a sun gear of the second planetary set (P2) and a sun gear of the third planetary set (P3), the fourth shaft (4) permanently connects a web of the first planetary set (P1) with a ring gear of the third planetary set (P3), the fifth shaft (5) is permanently connected with a ring gear of the first planetary set (P1) and the sixth shaft (6) permanently connects a web of the third planetary set (P3) with a ring gear of the second planetary set (P2);

the third shaft (3) is attachable to the housing by a first brake (03), the fourth shaft (4) is attachable to the housing by a second brake (04), the fifth shaft (5) is attachable to the housing by a third brake (05), a first clutch (16) detachably interconnects the input shaft (1) and the sixth shaft (6), a second clutch (56) detachably interconnects the fifth shaft (5) and the sixth shaft (6) and either one of a third clutch (14) detachably interconnects the input shaft (1) and the fourth shaft (4) with one another or a fourth clutch (45) detachably interconnects the fourth shaft (4) and the fifth shaft (5) with one another.

2. The multiple gear transmission according to claim 1, wherein the first, the second and the third planetary sets (P1, P2, P3) are minus planetary sets.

3. The multiple gear transmission according to claim 1, wherein at least one free wheel is located between at least one of the six rotatable shafts (1, 2, 3, 4, 5, 6) and the housing.

4. The multiple gear transmission according to claim 1, wherein the input to and the output from the multiple gear transmission are provided on the same side of the housing.

5. The multiple gear transmission according to claim 1, wherein at least one of an axle differential and a distributor differential is connected with the input shaft (1).

6. The multiple gear transmission according to claim 1, wherein an external starting element is located along a power flow direction out of the transmission, and the input shaft (1) is connected with a crankshaft of an engine.

7. The multiple gear transmission according to claim 1, wherein a torsional vibration damper is located between an engine and the transmission.

8. The multiple gear transmission according to claim 1, wherein at least one of the input shaft, the output shaft, the third, fourth, fifth, and sixth rotatable shafts includes at least one wear-free brake.

9. The multiple gear transmission according to claim 1, wherein at least one of the brakes of the six shifting elements (03, 04, 05, 14, 16, 45, 56) is a form-locking brake and at least one of the clutches of the six shifting elements (03, 04, 05, 14, 16, 45, 56) is a form-locking clutch.

10. The multiple gear transmission according to claim 1, wherein an electric machine is is connected with at least one of the input shaft, the output shaft, the third, fourth, fifth, and sixth rotatable shafts and operates as at least one of a generator and an additional prime mover.

11. The multiple gear transmission according to claim 1, wherein said input shaft (1) is separated from an engine by a coupling element.

12. The multiple gear transmission according to claim 11, wherein one of a hydrodynamic converter, a hydraulic clutch, a dry starting clutch, a wet starting clutch, a magnetic clutch and a centrifugal clutch is provided as the coupling element.

13. The multiple gear transmission according to claim 1, wherein starting of the multiple gear transmission results from engagement of at least one of the six shifting elements of the transmission, and the input shaft (1) is fixedly connected with a crankshaft of an engine.

14. The multiple gear transmission according to claim 13, wherein at least one of the first brake (03), the second brake (04) and the third brake (05) is used as at least one of the six shifting elements.

15. The multiple gear transmission according to claim 1, wherein at least one of the input shaft, the output shaft, the third, fourth, fifth, and sixth rotatable shafts includes a power takeoff for driving at least one additional aggregate.

16. The multiple gear transmission according to claim 15, wherein one of the input shaft (1) and the output shaft (2) includes the power takeoff for driving the at least one additional aggregate.

17. The multiple gear transmission according to claim 1, wherein at least one of the shifting elements is a power-shifting clutch.

18. The multiple gear transmission according to claim 17, wherein at least one of multi-disc clutches, band brakes and cone clutches is used as one of the six shifting elements (03, 04, 05, 14, 16, 45, 56).

* * * * *